United States Patent [19]

Saitoh et al.

[11] Patent Number: 5,330,565

[45] Date of Patent: Jul. 19, 1994

[54] ACTIVE AGENT-CONTAINING PRINTING INK

[75] Inventors: Hachiro Saitoh, Yokosuka; Toshimichi Matsui, Joyo, both of Japan

[73] Assignee: Nippon Petrochemicals Company Limited, Tokyo, Japan

[21] Appl. No.: 987,234

[22] Filed: Dec. 7, 1992

Related U.S. Application Data

[63] Continuation of Ser. No. 716,893, Jun. 18, 1991, abandoned, which is a continuation-in-part of Ser. No. 460,402, Jan. 3, 1990, abandoned.

[51] Int. Cl.$^5$ ..................... C09D 11/02; C09D 5/00
[52] U.S. Cl. ..................... 106/20 R; 523/161; 523/351; 524/562
[58] Field of Search ............. 106/20 R; 523/161, 351; 524/562

[56] References Cited

U.S. PATENT DOCUMENTS 4,490,323 12/1984 Thompson .................... 523/351
4,515,849  5/1985 Keino et al. .................. 428/201

FOREIGN PATENT DOCUMENTS 51-15769   5/1976  Japan .
0020055    2/1981  Japan ........................... 523/351
61-102598  6/1986  Japan .
61-103324  7/1986  Japan .
62-572     1/1987  Japan .

OTHER PUBLICATIONS

Hawleys Condensed Chemical Dictionary 11th ed. 1987 p. 734.

Primary Examiner—Joseph L. Schofer
Assistant Examiner—Peter D. Mulcahy
Attorney, Agent, or Firm—Scully, Scott, Murphy & Presser

[57] ABSTRACT

Active agent-containing printing ink which contains fine particles of thermoplastic polymer containing an active agent. The effect of active agent contained in a printed matter can be properly and effectually produced for a long period of time without causing undesirable release or deterioration of the active agent in printing and uses.

7 Claims, No Drawings

5,330,565

ACTIVE AGENT-CONTAINING PRINTING INK

CROSS-REFERENCE TO RELATED APPLICATION

This is a continuation of copending application Ser. No. 716,893, filed on Jun. 18, 1991, now abandoned, which is a continuation-in-part of application Ser. No. 460,402, filed Jan. 3, 1990 now abandoned.

BACKGROUND OF THE INVENTION

1. Field of the Invention

This invention relates to a printing ink which contains an active agent or agents. More particularly, the invention relates to an active agent-containing printing ink which can be used for printing articles made of synthetic resin as well as other various goods made of paper, cloth, leather, wood or bamboo, china or porcelain, glass and metals, and wall surfaces of rooms.

The active agent-containing printing ink of the present invention is characterized in that the effect of active agent contained therein can be properly controlled and can be maintained for a long period of time.

2. Description of the Prior Art

In the conventional art, perfumes or other functional chemicals (hereinafter referred to as "active agents") are sometimes blended into printing ink in order to give the effect of active agent on printed goods.

In Japanese Laid-Open Utility Model Publication No. 62-572, it is disclosed that a chemical agent is directly mixed into a printing ink. Japanese Laid-Open Utility Model Publication No. 61-102598 and No. 61-103324 disclose that a chemical agent which is included in cyclodextrin is mixed in printing ink. Japanese Patent Publication No. 51-15769 discloses the use of chemical agents which are adsorbed by a porous substance or contained in microcapsules.

U.S. Pat. No. 4,515,849; Keino et al., teaches a printing ink which can be formulated form a high polymer thermoplastic resin. However, Keino reference relates to a transfer printing sheet which comprises a base sheet such as cellulose fiber paper, a releasing resin layer, a pattern layer and a dissolving agent layer. The art is similar to that of the above Japanese Laid-Open Utility Model Publication No. 62-572 wherein a chemical agent is mixed directly into printing ink. This reference does not teach the utilization of a thermoplastic polymer as a carrier impregnated with the active agent and then mixing the active agent-containing thermoplastic polymer into printing ink.

There have been, however, several problems in that, when an active agent is directly mixed into a printing ink, the active agent is liable to be evaporated and released during printing operation, which fact shortens the effective life of the active agent. In the case that cyclodextrin is used, full effect of the active agent is hardly produced because most part of the active agent remains as included. In the method to use a porous substance, the effective life is not long enough. In the microcapsule method, it is necessary to rupture the microcapsules in order to produce the effect of active agent.

In order to solve the above problems in the prior art, the inventors of the present application have made extensive investigations, and as a result, the present invention has been accomplished.

BRIEF SUMMARY OF THE INVENTION

It is, therefore, the primary object of the present invention to provide improved printing ink which contains an active agent.

Another object of the present invention is to provide active agent-containing printing ink which can produce the controlled effect of active agent for a long period of time and the most part of the active agent is effectually released without any special operation or treatment.

In accordance with the present invention, the active agent-containing printing ink is characterized in that it contains numerous fine particles of thermoplastic polymer containing an active agent.

DETAILED DESCRIPTION OF THE INVENTION

In the present invention, the fine particles of thermoplastic polymers are exemplified by those made of petroleum resin, polybutene, polymethacrylate resin, polyvinyl chloride resin, polystyrene resin, non-vulcanized natural rubber or synthetic rubber, carboxyl group-containing ethylene copolymer, polyolefin resins such as high, medium or low density homopolymer of ethylene, other homopolymers of polypropylene, poly-1-butene, poly-4-methylpentene, copolymers of α-olefins such as ethylene, propylene, 1-butene and 1-hexene, polyolefins modified with unsaturated carboxylic acids or their derivatives, polyamide resins such as nylon-6, polyvinyl alcohol resin, polyester resin, saponification product of ethylene-vinyl acetate copolymer, and mixture of any of the above.

Among them, carboxyl group-containing ethylene copolymer such as ethylene-vinyl acetate copolymer, ethylene-acrylic ester copolymer and ethylene-methacrylic ester copolymer are preferable because they have compatibility with several active agents. Furthermore, it is desirable that the above ethylene copolymer is mixed with other plastics in order to control the intensity and service life of active agent after the application of printing ink. More particularly, it is exemplified by a mixture of ethylene-vinyl acetate copolymer and low density polyethylene and a mixture of ethylene-ethylacrylate copolymer and low density polyethylene. In these mixtures, it is desirable that the content of the foregoing carboxyl group-containing ethylene copolymer is more than 50% by weight.

The active agents which are used for the active agent-containing plastics particles are exemplified by perfumes, rust inhibitors, antifungal agents, antiseptic agents, insecticides, rodenticides, deodorants, vermicides, repellents and antifouling agents.

The above active agents are further described in the following.

Perfumes are divided into two Groups of natural perfumes and artificial perfumes. The natural perfumes are exemplified by animal perfumes such as musk, civet, castreum and ambergris and vegetable perfumes consisting of essential oils such as lavender oil, peppermint oil, lemon oil, orange oil, rose oil, camphor oil, sandalwood oil and hinoki oil.

The artificial perfumes are exemplified by synthetic perfumes such as terpene compounds and aromatic compounds, isolated perfumes derived by fractional distillation from essential oils, and other various isolated perfumes, and formulated perfumes prepared by mixing synthetic perfumes and natural perfumes in compliance with practical uses.

The rust inhibitors are exemplified by organic and inorganic salts of organic amines such as dicyclohexyl ammonium nitrite, cyclohexyl ammonium carbonate, isopropyl ammonium benzoate and diisopropyl ammonium succinate, aromatic acids such as benzoic acid and naphthoic acid, fatty acids having 6 to 10 carbon atoms such as caprylic acid, pelargonic acid and captic acid, heterocyclic amines such as benzotriazole and methylbenzotriazole, aromatic compounds which are substituted with nitro groups such as dinitrobenzene and nitronaphthalene, and hexamethylenetetramine and its derivatives. These compounds can be used either singly or in a mixture of two or more.

Other active agents are further exemplified by antiseptic agents for foods such as sorbic acid and dehydroacetic acid, antifungal agents such as thiabendazole, vinazine and α-bromocinnamaldehyde (BCA), insecticides and vermicides such as DDT, BHC, drine-agents, parathion, DDVP and PGP,. Germicides such as formalin, salicylic acid, creosote, phenol, nitrofurazone, and nitrofurylacrylic acid amide, rodenticides such as "Naramycin" (trademark, made by Tanabe Seiyaku Co. Ltd.), "Ramtarine" (trademark, made by Matsushita Electric Works Co., Ltd., "Kotomycin" (trademark, made by Osaka Kasei Co., Ltd.), and antifouling agents such as phenylmercuric acetate, phenylmercuric oleate, copper naphthenate and copper oleate. These active agents can be used singly or in combination of two or more kinds in accordance with the purpose and utility of the printing ink to be prepared.

The mixing ratio of the above active agents is preferably at least 5 part by weight relative to 100 parts by weight of the thermoplastic polymer particles. If the ratio is less than 5 part by weight, the effect of active agent in printing ink cannot be expected.

The mixing of an active agent with a thermoplastic polymer is done by fusing and blending the active agent and the thermoplastic polymer together in an ordinary kneader or extruder. When the active agent is a liquid perfume, a thermoplastic polymer having compatibility with the active agent is directly soaked into and impregnated with the active agent. In the case that an active agent is a solid material such as rust inhibitors, it is previously dissolved in a suitable solvent and a thermoplastic polymer having compatibility with the active agent is then soaked into and impregnated with the solution of the active agent.

In the present invention, the impregnation with an active agent can be done either prior to or after the grinding or size reduction of thermoplastic polymer.

The grinding of thermoplastic polymer can be done by conventional methods such as mechanical grinding and solvent precipitation method. The average diameter of obtained fine particles are preferably 1 μm to 1 mm in view of the printability of printing ink and the holding and releasing of active agent. In the case that the diameter of particles is smaller than 1 μm, the effective life of active agent is short and the preparation cost is high. On the other hand, when the diameter of particles exceeds 1 mm, it is not desirable because some part of active agent is remained in particles without producing its whole effect.

Furthermore, the density of the particles is also an important factor. It is preferable that the density of the particles is in the range of 0.5 to 2.0 g/cm$^3$. If the density is not in this range, the stability of printing ink is lost causing phase separation.

In addition, various natural or synthetic resins can be added to the above printing ink according to the present invention in order to stick tightly the polymer particles to the surface of goods to be printed.

Furthermore, coloring agents (dyes or pigments), resins and other suitable additives can be added to the printing ink. Of course, these resins, coloring agents and other additives may be those commonly used for conventional printing inks.

For example, thermoplastic resins, thermoserring resins, light sensitive resins and one-component type or two-component type reactive resins can be added as such resinous materials.

As the coloring agents, organic coloring agents, inorganic coloring agents, dyestuffs, metal powders and body pigments such as calcium carbonate and barium carbonate can be used.

As other additives, there are organic and inorganic foaming agents, plasticizers, stabilizers, defoaming agents, slipping agents such as wax and silicone, .antiseptic agents, antifungal agents, leveling agents, delusters such as silica, fine hollow beads and plastics particles.

The printing ink herein referred to means transparent inks and colored inks which are used for solid printing or pattern printing with printing presses for offset, photogravure, relief, flexographic and silk screen printing.

An example of the composition of active agent-containing printing ink according to the present invention is shown in the following.

| | |
|---|---|
| Active agent-containing thermoplastic polymer particles | 5-60 wt. % |
| Resin | 5-40 wt. % |
| Solvent or water | 0-80 wt. % |
| Coloring agent | 0-40 wt. % |
| Additive | 0-15 wt. % |

In the printing ink of the present invention, because the active agent is contained in the thermoplastic polymer particles, the undesirable wasteful releasing of active agent by evaporation can be avoided.

In addition, because the gradual oozing out and releasing of active agent can be well controlled by properly selecting the kinds of polymer particles and active agent and the diameter of polymer particles, the effect of active agent can be maintained properly and uniformly for a long period of time until the active agent is exhausted.

The present invention will be described in more detail with reference to several examples.

Example 1

Perfume-containing photogravure printing ink was prepared by mixing and dispersing together the materials of the following composition.

| | |
|---|---|
| Coloring pigment | 5 parts by weight |
| Vinyl chloride/vinyl acetate copolymer resin | 9 parts by weight |
| Plasticizer (Dioctylphthalate) | 2 parts by weight |
| Methyl ethyl ketone | 17 parts by weight |
| Methyl isobutyl ketone | 10 parts by weight |
| Toluene | 17 parts by weight |
| Perfume-containing thermoplastic polymer powder | 40 parts by weight |

The above perfume-containing thermoplastic polymer powder was the powder of ethylene/vinyl acetate copolymer resin (400 mesh through) containing 50 parts by weight of commercially available prepared lemon perfume.

Using the photogravure printing ink of the above formula, photogravure printing was carried out on polyvinyl chloride films. There was no problem in view of printability. The printed films were left as they were in a room for 3 months. As a result, it was confirmed that, even though the intensity of odor became a little weaker, fragrance just like that of 3 month before was sufficiently sensed.

In the meantime, other printed films were applied with protective coating of acrylic resin and two-component type reactive urethane resin, respectively, by photogravure printing just after the above printing. With regard to these printings, the effective life of fragrance was further improved.

EXAMPLE 2

A photogravure printing ink containing deodorant was prepared by mixing and dispersing together the materials of the following composition.

| | |
|---|---|
| Acrylic emulsion | 59.4 parts by weight |
| Defoaming agent | 0.1 part by weight |
| Antifungal-antiseptic agent | 0.5 part by weight |
| Thermoplastic polymer powder containing deodorant | 40.0 parts by weight |

The above deodorant-containing thermoplastic polymer powder was the powder of ethylene/vinyl acetate copolymer resin (70 mesh through) containing 40 parts by weight of a commercially available deodorant (trademark: Biodash, made by Osaka Soda Co., Ltd. and Tokyo Seikagaku Kenkyusho Co., Ltd.)

Using the photogravure printing ink of the above formula, solid printing was carried out on non-woven wall cloth. There occurred no problem in view of printability.

The printed wall cloth was pasted up on the wall of 20 $m^2$ in an office reception room in order to test the deodorant effect for the smell of cigarette or the like. As a result, the deodorant effect was observed for a period of at least 6 month.

EXAMPLE 3

A flexographic printing ink containing insecticide was prepared by mixing and dispersing together the materials of the following composition.

| | |
|---|---|
| Water | 32.0 parts by weight |
| Ammonia (26% aqueous soln.) | 1.0 part by weight |
| Plasticizer, stabilizer | 1.0 part by weight |
| Defoaming agent | 0.1 part by weight |
| Rosin-modified maleic acid resin (acid value: 13–14°) | 11.0 parts by weight |
| Acrylic emulsion (solid content: 35%) | 8.0 parts by weight |
| Coloring pigment | 12.0 parts by weight |
| Thermoplastic polymer powder containing insecticide | 35.0 parts by weight |

The above insecticide-containing thermoplastic polymer powder was the powder of ethylene/vinyl acetate copolymer resin (300 mesh through) containing 30 parts by weight of commercially available insecticide (trademark: Pinamin Forte, made by Sumitomo Chemical Co., Ltd.).

The above flexographic printing ink was diluted with water to a viscosity of 15 seconds with Zahn-cup No. 3. Solid printing and pattern printing were done on machine glazing kraft paper using the above printing ink without any problem in printability, thereby obtaining printed paper for making paper bags with good anti-insect effect.

EXAMPLE 4

In place of "powder of ethylene/vinyl acetate copolymer resin (400 mesh through) containing 50 parts by weight of commercially available prepared lemon perfume" used in Example 1, "a mixture of 50 parts by weight of ethylene/vinyl acetate copolymer (vinyl acetate content: 35 wt. %) and 50 parts by weight of low density polyethylene" was mixed with 50 parts by weight of commercially available prepared lemon perfume and it was reduced to powder of 400 mesh through. The thus obtained perfume-containing thermoplastic polymer powder was used in the like manner as in Example 1 to prepare perfume-containing photogravure printing ink.

Using this photogravure printing ink, photogravure printing was carried out on vinyl chloride films. There was no problem in view of printability. Even though the intensity of odor was a little weaker than the results in Example 1 when the printed films were left as they stand in a room for 3 months, the intensity of odor after 1 month was stronger than the cases in Example 1.

COMPARATIVE EXAMPLE 1

A perfume-containing photogravure printing ink was prepared in the like manner as in Example 1 except that 20 parts by weight of commercially available prepared lemon perfume was used in place of 40 parts by weight of perfume-containing thermoplastic polymer powder.

Using this printing ink, photogravure printing was carried out on vinyl chloride films. The perfume was released intensely during the drying step in printing and the printing room was filled with the odor of lemon.

The intensity of lemon odor of the printed material was weak. The printed material was left as it is in a room for one week, where the odor was hardly observed.

COMPARATIVE EXAMPLE 2

Microcapsules with gelatin membrane was prepared by using 40 parts by weight of commercially available prepared lemon perfume and 60 parts by weight of gelatin. A perfume-containing printing ink was prepared in the like manner as in Example 1 except that 50 parts by weight of the above perfume-containing microcapsules were used in place of 40 parts by weight of perfume-containing thermoplastic polymer powder.

Using this printing ink, photogravure printing on vinyl chloride films was tried, however, the printing was impossible because the particle size of the microcapsules was too large, meanwhile silk screen printing was barely carried out with the same printing ink.

The printed matter hardly had the odor and when it was rubbed with a nail, the odor was barely felt, however, its odor did not lasted for 1 month.

COMPARATIVE EXAMPLE 3

Printing ink was prepared in the like manner as in Comparative Example 2 except that 1 part by weight of surface active agent to swell the gelatin was added to the commercially available prepared lemon perfume.

Using this printing ink, silk screen printing was carried out on vinyl chloride films.

The printed matter had some odor but the odor was so weak that it is not acceptable in practical use.

COMPARATIVE EXAMPLE 4

Printing ink containing perfume was prepared in the like manner as in Comparative Example 2 except that cyclodextrin was used in place of gelatin to prepare cyclodextrin containing commercially available lemon perfume and this cyclodextrin containing perfume was used for preparing printing ink.

Using this printing ink, silk screen printing was carried out. Because the particle size of cyclodextrin was large and it was thermally broken, the perfume was released intensely during the drying step in printing and the printing room was filled with the odor of lemon.

The intensity of odor was considerably large just after the printing, however, the odor was almost lost after 3 months.

COMPARATIVE PRINTING TESTS

By using the active agent-containing inks prepared in the foregoing Examples 1 to 4 and Comparative Example 1, several comparative printing tests were carried out with the materials listed in the following Tables 1 to 4.

The results with regard to printability and duration of effect (service life) are also shown in the following Tables 1 to 4.

TABLE 1

| | Examples | | |
|---|---|---|---|
| | Example 1 | Comparative Example 1 | Test 1 |
| Ink (Total parts by weight) | 100 | 80 | 100 |
| Perfume-containing thermoplastic polymer powder | 40 | — | — |
| Perfume | (20)(*1) | 20 | 20 |
| EVA powder, 400 mesh | (20) | — | 20 |
| Adhesive resin | 9 | 9 | 9 |
| VC/VA copolymer | | | |
| Additive to resin | 2 | 2 | 2 |
| Dioctylphthalate | | | |
| Coloring pigment | 5 | 5 | 5 |
| Solvent | | | |
| Methyl ethyl ketone | 17 | 17 | 17 |
| Methyl isobutyl ketone | 10 | 10 | 10 |
| Toluene | 17 | 17 | 17 |
| Printability (Printed onto PVC film by photogravure printer) | Excellent | Fair(*2) | Good |
| Smell during drying in printer | Small | Large | Large |
| Intensity of fragrance | | | |
| Initial | Strong | Weak | Weak |
| After 1 week | — | Hardly | Hardly |
| After 3 months | Sufficient | — | — |

Notes:
(*1)In Tables 1 to 4, the brackets ( ), < > indicate breakdowns of the amount on the preceding line.
(*2)"Fair" indicates a level somewhat inferior to an ordinary level.

TABLE 2

| | Examples | | |
|---|---|---|---|
| | Example 2 | Test 2-1 | Test 2-2 |
| Ink (Total parts by weight) | 100.0 | 76.0 | 100.0 |
| Deodorant-containing thermoplastic polymer powder | 40.0 | — | — |
| Deodorant | (16.0) | 16.0 | 16.0 |

TABLE 2-continued

| | Examples | | |
|---|---|---|---|
| | Example 2 | Test 2-1 | Test 2-2 |
| EVA powder, 70 mesh | (24.0) | — | 24.0 |
| Adhesive resin | 59.4 | 59.4 | 59.4 |
| Acrylic emulsion | | | |
| Defoaming agent | 0.1 | 0.1 | 0.1 |
| Antifungal-antiseptic agent | 0.5 | 0.5 | 0.5 |
| Printability | Excellent | Fair | Good |
| (Printed onto non-woven wall cloth by photogravure printer) | | | |
| Period of deodorant effect | More than 6 months | Less than 1 month | Less than 1 month |

TABLE 3

| | Examples | | |
|---|---|---|---|
| | Example 3 | Test 3-1 | Test 3-2 |
| Ink (Total parts by weight) | 100.1 | 75.6 | 100.1 |
| Insecticide-containing thermoplastic polymer powder | 35.0 | — | — |
| Inseticide | (10.5) | 10.5 | 10.5 |
| EVA powder, 300 mesh | (24.5) | — | 24.5 |
| Adhesive resin | | | |
| Arylic emulsion (Solid content: 35%) | 8.0 | 8.0 | 8.0 |
| Rosin-modified maleic acid resin (acid value: 12-14°) | 11.0 | 11.0 | 11.0 |
| Plasticizer and stabilizer | 1.0 | 1.0 | 1.0 |
| Ammonia (26% aqueous soln.) | 1.0 | 1.0 | 1.0 |
| Water | 32.0 | 32.0 | 32.0 |
| Defoaming agent | 0.1 | 0.1 | 0.1 |
| Coloring agent | 12.0 | 12.0 | 12.0 |
| Printability (*1) (Printed onto glazing kraft paper by flexographic printer) | Excellent | Fair | Good |
| Period of deodorant effect | More than 3 months | Less than 2 weeks | Less than 2 weeks |

Note:
(*1) The used ink was diluted with water to a viscosity of 15 sec. with Zahn-cup No. 3.

TABLE 4

| | Examples | | |
|---|---|---|---|
| | Example 4 | Test 4-1 | Test 4-2 |
| Ink (Total parts by weight) | 100 | 80 | 100 |
| Perfume-containing thermoplastic polymer powder | 40 | — | — |
| Perfume | (20) | 20 | 20 |
| 400 mesh resin powder | (20)(*1) | — | (20)(*1) |
| EVA (35 wt % VA) | <10> | — | <10> |
| LDPE | <10> | — | <10> |
| Additive resin | | | |
| VC/VA copolyer | 9 | 9 | 9 |
| Additive to resin | | | |
| Dioctylphthalate | | | |
| Coloring pigment | 5 | 5 | 5 |
| Solvent | | | |
| Methyl ethyl ketone | 17 | 17 | 17 |
| Methyl isobutyl ketone | 10 | 10 | 10 |
| Toluene | 17 | 17 | 17 |
| Printability (Printed onto PVC film by photogravure printer) | Excellent | Fair | Good |
| Smell in drying in printer | Small | Large | Large |
| Intensity of fragrance | | | |
| Initial | Very strong | Weak | Weak |
| After 1 month | — | Hardly | Hardly |
| After 3 months | Moderate | — | — |

Note:
(*1)Prepared by previously mixing 10 wt. parts of EVA and 10 wt. parts of LDPE and then pulverized.

In view of Table 1, when the thermoplastic polymer powder was not used (Comparative Example 1), the evaluation of printability was somewhat inferior to the level in which unimpregnated polymer powder was used because the viscosity of ink was too low. The evaporation in the drying step in printer was large and the fragrance was hardly observed after 1 week.

In Test 1, polymer powder was used but it was not previously impregnated with the perfume. In this case, even though the printability was improved but the intensity of fragrance was the same as that of Comparative Example 1.

On the other hand, when the polymer powder was previously impregnated with the perfume in Example 1, the printability was excellent and the fragrance was strong for long time because the evaporation was controlled.

In view of the next Table 2, when the thermoplastic polymer powder was previously impregnated with the deodorant (Example 2), the evaluation of both the printability and the period of deodorant effect were superior to those in the cases in which the polymer powder was not used (Test 2-1) and unimpregnated polymer powder was used (Test 2-2).

This fact was just the same as the results in the use of the insecticide, as shown in Table 3.

In view of the results shown in Table 4, the blended powder of EVA and LDPE was used (Example 4) in place of the EVA powder singly of Example 1, where the intensity of fragrance after 3 months was somewhat weaker than the case of Example 1. However, in the initial period of use, the intensity of fragrance in Example 4 could be made stronger than the intensity in Example 1 owing to the use of LDPE. It will be understood that the results in Test 4-1 and Test 4-2 were not desirable as compared with the results of Example 4.

Because the printing ink according to the present invention contains particles of active agent-containing polymer, the printing ink itself can produce the effect of active agent without requiring any special treatment such as the rupturing of microcapsules. Furthermore, by selecting the particle size the combination of resin powders, the releasing rate of active agent can be controlled and the effect of active agent lasts long until the active agent is almost exhausted. Still further, the printability of the printing ink is good enough.

What is claimed is:

1. An active agent-containing printing ink comprising
   (a) printing ink; and
   (b) active agent-containing fine particles of a thermoplastic polymer,
   said thermoplastic polymer being compatible with the active agent and having been combined previously with the active agent by impregnation, wherein said active agent is selected from the group consisting of insecticides, perfumes and deodorants, and
   said active agent-containing fine particles of said thermoplastic polymer being of a size and density effective to provide the effect of the active agent to said printing ink when said ink is applied to a substrate.

2. The active agent-containing printing ink in claim 1, wherein said thermoplastic is carboxyl group-containing ethylene copolymer or a mixture of said ethylene copolymer with other synthetic resins.

3. The active agent-containing printing ink in claim 1 or 2, wherein said carboxyl group-containing ethylene copolymer has at least one member selected from the group consisting of ethylene-vinyl acetate copolymer, ethylene-acrylic ester copolymer and ethylene-methacrylic ester copolymer.

4. The active agent-containing printing ink in claim 2, wherein said thermoplastic polymer is a mixture of ethylene-vinyl acetate copolymer and low density polyethylene.

5. The active agent-containing printing ink of claim 1, wherein the density of said particles of thermoplastic polymer is in the range of 0.5 to 2.0 g/cm$^3$.

6. The active agent-containing printing ink of claim 1, wherein the average size of said particles of thermoplastic polymer is in the range of 1 micron to 1 mm.

7. The active agent-containing printing ink of claim 1, wherein the content of said particles of thermoplastic polymer is in the range of 5 to 90% by weight.

* * * * *